US012773083B2

(12) United States Patent
Schnitzer et al.

(10) Patent No.: US 12,773,083 B2
(45) Date of Patent: Oct. 27, 2026

(54) METHOD FOR OPERATING A MOBILE, SELF-PROPELLED APPLIANCE

(71) Applicant: BSH Hausgeräte GmbH, Munich (DE)

(72) Inventors: Frank Schnitzer, Bad Neustadt (DE); Kristina Daniel, Bad Neustadt (DE); Kai Schmitt, Saal (DE)

(73) Assignee: BSH Hausgeräte GmbH, Munich (DE)

( * ) Notice: Subject to any disclaimer, the term of this patent is extended or adjusted under 35 U.S.C. 154(b) by 20 days.

(21) Appl. No.: 18/857,493

(22) PCT Filed: Apr. 21, 2023

(86) PCT No.: PCT/EP2023/060395
§ 371 (c)(1),
(2) Date: Oct. 17, 2024

(87) PCT Pub. No.: WO2023/208754
PCT Pub. Date: Nov. 2, 2023

(65) Prior Publication Data

US 2025/0268442 A1 Aug. 28, 2025

(30) Foreign Application Priority Data

Apr. 25, 2022 (DE) ..................... 10 2022 203 985.8

(51) Int. Cl.
*A47L 11/40* (2006.01)
*A47L 9/28* (2006.01)
*H02J 7/90* (2026.01)

(52) U.S. Cl.
CPC ......... *A47L 11/4011* (2013.01); *A47L 9/2836* (2013.01); *A47L 9/2857* (2013.01);
(Continued)

(58) Field of Classification Search
CPC ............ A47L 2201/022; G05D 1/0217; G05D 1/0016; G05D 1/225; G05D 1/0044; G05B 2219/25419; G05B 2219/45098
See application file for complete search history.

(56) References Cited

U.S. PATENT DOCUMENTS 10,813,513 B2 10/2020 Erkek et al.
11,283,276 B2 3/2022 Buchholz et al.
(Continued)

FOREIGN PATENT DOCUMENTS

DE 102017109219 A1 10/2018
DE 102017112663 A1 12/2018
(Continued)

*Primary Examiner* — Erin M Piateski
*Assistant Examiner* — John C Merino
(74) *Attorney, Agent, or Firm* — Laurence A. Greenberg; Werner H. Stemer; Ralph E. Locher

(57) ABSTRACT

A method for operating a mobile, self-propelled appliance, in particular a floor cleaning device such as a vacuum and/or sweeping and/or wiping robot, having a rechargeable battery. A user specifies on a portable additional device, a time window in which the mobile, self-propelled appliance should carry out at least one specified cleaning task and the mobile appliance automatically determines its recharging time of the rechargeable battery in this time window, and/or the user specifies the time period in which the mobile, self-propelled appliance should carry out no cleaning tasks. The mobile, self-propelled appliance automatically determines at an end of the time period to charge the rechargeable battery to its full charge capacity.

17 Claims, 3 Drawing Sheets

(52) U.S. Cl.
CPC ......... *A47L 9/2884* (2013.01); *A47L 11/4005* (2013.01); *H02J 7/933* (2026.01); *A47L 2201/022* (2013.01)

(56) References Cited

U.S. PATENT DOCUMENTS

| | | | | |
|---|---|---|---|---|
| 2018/0184868 | A1 | 7/2018 | Han | |
| 2018/0344116 | A1 * | 12/2018 | Schriesheim | A47L 9/2826 |
| 2018/0353039 | A1 * | 12/2018 | Erkek | G05D 1/0272 |
| 2020/0019178 | A1 * | 1/2020 | Orzechowski | A47L 11/4011 |
| 2020/0319640 | A1 | 10/2020 | Vogel et al. | |

FOREIGN PATENT DOCUMENTS

| | | | | |
|---|---|---|---|---|
| DE | 102017123665 | A1 | 4/2019 | |
| DE | 102019213086 | A1 | 3/2021 | |
| WO | WO-2023046449 | A1 * | 3/2023 | A47L 11/4011 |

* cited by examiner

METHOD FOR OPERATING A MOBILE, SELF-PROPELLED APPLIANCE

FIELD AND BACKGROUND OF THE INVENTION

The invention relates to a method for operating a mobile, self-propelled appliance, in particular a floor cleaning device, such as a vacuum and/or sweeping and/or wiping robot which comprises a rechargeable battery.

Mobile, self-propelled appliances, such as for example vacuum robots, have the task of cleaning an entire floor area as autonomously as possible. Autonomous vacuum robots are designed to carry out their tasks as automatically as possible, in particular without user intervention. This includes not only the automatic planning and performing of the cleaning tasks but also the independent locating of the charging station and the recharging of the rechargeable battery in order to have sufficient capacity available for future cleaning tasks.

A recharging of the rechargeable battery can be required not only after a cleaning task. When carrying out cleaning tasks in rooms having a large surface area, in the case of a plurality of rooms or in the case of a very high cleaning performance, the rechargeable battery charge level can drop to such a low value that the cleaning task cannot be fully completed.

Since recharging the rechargeable battery generally demands significantly more time than draining the rechargeable battery, vacuum robots which have to charge their rechargeable battery before completing their cleaning task are only able to finish their task after several hours. This can be disruptive for a user who has started the vacuum robot while absent, comes back home after several hours and then still finds the vacuum robot cleaning. It can also have an alarming effect if, after several hours at its charging station, the vacuum robot unexpectedly starts up on its own without warning, in order to complete the cleaning task which has been started and is not yet finished.

It is known to reduce the total duration of a cleaning task by a required interim recharging being reduced to a minimum. To this end, before the start of a cleaning or when stopping the cleaning, the vacuum robot checks what charge capacity has to be present for the intended cleaning. The charging process at the charging station is shortened on the basis thereof, by only a sufficient charge which is required for the remaining cleaning being put into the rechargeable battery. However, this can disadvantageously result in the vacuum robot having a fully discharged rechargeable battery immediately after the cleaning and thus not being able to be used by the user for spontaneous further cleaning tasks within a certain subsequent time.

After each completed cleaning pass, the robot generally charges itself up again at the charging station as preparation for the next tasks. In order to be ready at all times for a new cleaning task, the rechargeable battery is generally fully charged. The rechargeable batteries primarily used in vacuum robots, however, are self-discharging. In addition, energy for the standby mode of the vacuum robot is taken from the rechargeable battery so that from time to time this rechargeable battery has to be charged up again in order to continue to have a full charge level. This repeated trickle charging and the permanently high charge level of the rechargeable battery associated therewith, however, causes stress for the rechargeable battery and reduces its service life. The rechargeable battery ages as a result, which means that it can store less capacity with each charging cycle and, in particular, over time can process increasingly fewer cleaning tasks before the rechargeable battery has to be charged up again.

It is disclosed in the publications DE 10 2017 123 665 A1 and DE 10 2017 112 663 A1 that the rechargeable battery is only charged when cleaning is imminent. In the remaining time, the rechargeable battery is in a storage phase. In the event of a spontaneous cleaning task by the user, the vacuum robot first has to charge up its rechargeable battery.

In order to be able to start a spontaneous cleaning task without delay, as far as possible the rechargeable battery should not be drained. At the same time, in order to increase the service life of the rechargeable battery, the rechargeable battery should not be constantly recharged and stressed by trickle charging.

SUMMARY OF THE INVENTION

It is the object of the invention to provide the user with an operating method which is characterized by a user-based rechargeable battery charging and which at the same time ensures a longer service life of the rechargeable battery.

This object is achieved by a method for operating a mobile, self-propelled appliance, in particular a floor cleaning device for the autonomous treatment of floor areas, having the features as claimed. Advantageous embodiments and developments form the subject matter of the dependent claims.

According to the invention, in a method for operating a mobile, self-propelled appliance, in particular a floor cleaning device for the autonomous treatment of floor areas, such as a vacuum and/or sweeping and/or wiping robot, which has a rechargeable battery, a user specifies on a portable additional device the time window in which the mobile, self-propelled appliance should carry out at least one specified cleaning task, wherein the mobile, self-propelled appliance automatically determines its recharging time of the rechargeable battery in this time window. In addition or alternatively, the user specifies the time period in which the mobile, self-propelled appliance should carry out no cleaning tasks, wherein the mobile, self-propelled appliance automatically determines at an end of the time period to charge the rechargeable battery to its full charge capacity. In particular, the user indirectly specifies thereby the time period in which the rechargeable battery of the mobile, self-propelled appliance is not to be charged (excepting at the end), unless a charge level of the rechargeable battery falls below a specified charge capacity (specified minimum value).

According to the invention, a charging of the rechargeable battery of the mobile, self-propelled appliance is thus permitted only in defined and specified time windows, whereby in this manner optimal conditions can be provided for the rechargeable battery and thus its service life can be advantageously increased. A time limit is also set by the user for the charging time at the charging station, whereby a total duration for processing a cleaning task can be reduced as a whole by the user, as desired. In particular, the user specifies a time limit within which the mobile, self-propelled appliance has to complete its task, so that on this basis the appliance adapts its recharging time.

The total duration of the cleaning task can preferably be decreased by a necessary interim recharging being reduced. The user, in particular, specifies a time window within which the mobile, self-propelled appliance has to complete its task so that on this basis the appliance adapts its recharging time. The user thus specifies a maximum duration required for the total cleaning, including charging time. If the appliance cannot finish its cleaning task with a rechargeable battery charge, it charges itself up again at least partially but ends the charging process prematurely and continues with the cleaning, such that the specified total duration is not exceeded.

The user can specify a maximum time duration, i.e. from starting the cleaning until finishing the cleaning, including an interim charging up of the rechargeable battery. Alternatively or additionally, a desired end time can be specified by the user, for example 17:00 hours. If the appliance estimates that its rechargeable battery can be fully charged and also that the cleaning can be completely finished within the specified time window, an interim charging of the rechargeable battery is not stopped. This advantageously results in a longer rechargeable battery service life. Moreover, by permitting a possible time window, this provides freedom to the appliance in designing the cleaning and charging sequence, wherein at the same time it can be guaranteed that the appliance has completed its tasks at the time specified by the user. This can prevent the user from feeling disturbed by the ongoing cleaning process in their presence.

The selection of a time window in the form of a time or a total duration permits the implementation of a function in which the mobile, self-propelled appliance no longer operates after a predetermined time of day or cleaning period. Advantageously, as a result the user is disturbed to a minimum by a moving and working appliance.

In particular, the ageing of the rechargeable battery can be further delayed and its service life increased by a time period which is specified by the user and within which the rechargeable battery of the appliance is not recharged. The rechargeable battery of the appliance is preferably not charged in the time period, since in this time period it can be predicted that the appliance should not carry out any cleaning tasks, such as for example at night. Outside this time period, i.e. at times when the user wishes to use the appliance for their cleaning, the appliance is charged up as usual and thus is ready at all times for its cleaning tasks.

In the specified time period of non-charging, a predetermined critical value is specified of the charge capacity of the rechargeable battery which should not be fallen below. When falling below this value, trickle charging takes place which charges up to an ideal storage charge level above the critical value, such as for example 50% of the rechargeable battery capacity, i.e. in particular not full charging of the rechargeable battery. The user fixes the start and end time of the time period themselves, in order to adapt the cleaning behavior of their appliance to their everyday routine. Preferably, the user can fix a plurality of time periods for each day in which the rechargeable battery of the mobile, self-propelled appliance is not in use and thus does not have to be charged, unless a charge level of the rechargeable battery falls below the specified charge capacity. Time periods which depend on the day of the week, i.e. different time periods depending on the day of the week, can also be implemented as required. Since the appliance is kept almost at a full charge level only outside the time periods, and a charging of the rechargeable battery takes place only at the end of the time period(s) and after cleaning passes, the stress of the rechargeable battery is advantageously reduced. Due to the trickle charging, the appliance is available to the user immediately with a full charge level outside the specified time periods.

The fixed time periods have an advantageous effect on the service life of the rechargeable battery of the appliance. If a user, for example, fixes a resting phase of 19:00 hours to 07:00 hours, this means approximately 12 hours per day in which the rechargeable battery is not stressed by a forced high charge level. This provides better conditions for the rechargeable battery for approximately half of its life.

A mobile, self-propelled appliance is understood to mean, in particular, a floor cleaning device, for example a cleaning device which autonomously treats floor areas, in particular in the household sector. This includes, amongst other things, vacuum and/or sweeping and/or wiping robots, such as for example robot vacuum cleaners. These appliances preferably work during operation (cleaning mode) without any user intervention or with as little user intervention as possible. For example, the appliance automatically travels into a specified room in order to clean the floor according to a specified and programmed-in method strategy.

In order to be able to take into account any individual environmental conditions, the mobile, self-propelled appliance preferably carries out an exploratory pass. An exploratory pass is understood to mean, in particular, a reconnaissance pass which is suitable for obtaining information about a floor area to be treated relative to obstacles, room layout and the like. The purpose of an exploratory pass, in particular, is to be able to estimate and/or to display conditions of the floor treatment region to be treated.

After the exploratory pass, the mobile, self-propelled appliance recognizes its environment and can forward this to the user in the form of an environment map, for example in an app (cleaning app) on a mobile device. In the environment map the option can be provided to the user to interact with the mobile, self-propelled appliance. The user can advantageously see information in the environment map and, if required, change and/or adapt this information.

An environment map is understood to mean, in particular, any map which is suitable for displaying the environment of the floor treatment region with all of its obstacles and objects. For example, the environment map shows the floor treatment region with the furniture and walls contained therein in sketch form.

The environment map with the obstacles is preferably displayed in the app on a portable additional device. This serves, in particular, for visualizing a possible interaction for the user.

An additional device is understood to mean in the present case, in particular, any device which is portable for a user and which is arranged outside the mobile, self-propelled appliance, in particular externally to and/or differentiated from the mobile, self-propelled appliance, and is suitable for displaying, providing, communicating and/or transmitting data, such as for example a cell phone, a smartphone, a tablet and/or a computer or laptop.

The app, in particular the cleaning app, is installed on the portable additional device, the app serving for the communication of the mobile, self-propelled device with the additional device, and in particular the visualization of the floor treatment region, i.e. the living room to be cleaned or the apartment or living area to be cleaned. The app preferably displays to the user the region to be cleaned as an environment map. The user can, for example, input, manage, start and end cleaning tasks in the app and/or input cleaning parameters or commands and/or check the charge capacity of the rechargeable battery.

A user is understood to mean, in particular, any end customer or end consumer who uses the mobile, self-propelled appliance and, in particular, has it carry out a cleaning task and/or cleaning pass in their own apartment or in their own living areas.

A rechargeable battery is understood to mean, in particular, any rechargeable battery which is suitable for being charged up again. A charge level of the rechargeable battery is understood to mean, in particular, the actual charge capacity which is present at the given time. A specified charge capacity not to be fallen below or minimum charge capacity specifies a minimum charge level (specified minimum value), wherein the rechargeable battery is charged when this is fallen below.

A time window is understood to mean, in particular, any time duration which contains, in particular, a start time and an end time and a time phase therebetween. A time period is likewise understood to mean any time duration which contains, in particular, a start time and an end time and a time phase therebetween.

Automatic is understood to mean, in particular, that the mobile, self-propelled appliance preferably automatically determines, fixes, starts, ends and/or plans its recharging time without user intervention or user information or user specification.

In an advantageous embodiment, in the case of a low charge capacity the rechargeable battery is charged up again during a cleaning pass in the time window, such that the time window specified by the user for a cleaning task is not exceeded as a whole. The charging time at the charging station is limited by the time window specified by the user, i.e. by the user setting a time limit. It is not absolutely necessary that the appliance only spends a minimum time duration at the charging station. In particular, the appliance freely divides how long it charges its rechargeable battery in the time window. The user permits the appliance a maximum total duration or sets an end operating time before the appliance has to be finished with its cleaning. With corresponding timings it is possible that after completing the cleaning jobs the appliance has a rechargeable battery which is not fully drained but partially charged and thus can be used directly afterwards for further cleaning jobs by the user, if required.

In a further advantageous embodiment, the mobile, self-propelled appliance stops the charging process in order to complete the cleaning task in the time window. In the present case, therefore, the cleaning time or task time is not limited in terms of time by the user specifications, but the time reduction is implemented via the charging time which is defined according to the user specification. The user specification is thus adapted on the basis of the recharging time. If the appliance cannot finish its cleaning task with the rechargeable battery charge which is present, the appliance partially charges up its rechargeable battery again but ends the charging process prematurely and continues with the cleaning such that the total duration specified by the user is not exceeded.

In a further advantageous embodiment, a calculation of a remaining time in the time window takes place by the analysis of previous cleaning passes, taking into account the required time and/or energy consumption with a corresponding power level. If the appliance has to stop the charging process in order to be able to complete its cleaning in good time, therefore, this takes place by a targeted analysis. The appliance learns how long it requires for which rooms or areas, and can estimate therefrom the duration of the cleaning which has not yet been completed. The appliance thus learns how much rechargeable battery charge is required for the individual rooms/areas and can estimate therefrom how much charge still has to be recharged for the part of the cleaning which has not yet been completed.

If the appliance has previously not carried out any cleaning passes on which it can base its estimation, a factory standard value can be used for each room/area.

Alternatively, the user can be prohibited from specifying the time window until the appliance is ready for an estimation or an estimation is possible.

In a further advantageous embodiment, a warning message is output to the user on the additional device if the cleaning task, with the required charging process, requires longer than the specified time window. As soon as an estimation of the required rechargeable battery charge can be carried out, for example after three completed cleaning passes, feedback can be provided to the user, when setting the time window, as to whether the appliance can adhere to this time window. If the appliance is highly likely to require longer than the user has allowed, the user can be prevented from setting a time window which is too limited or a corresponding message is output to the user by which the user can decide whether and/or that the appliance in this case should stop the cleaning even though it has not yet completed this cleaning.

In a further advantageous embodiment, the time window is a maximum time duration which it is possible to fall short of. The time window thus contains a maximum time duration from the start of the cleaning to the finish, including a possible interim charging of the rechargeable battery. If the appliance estimates that it can fully charge its rechargeable battery and can completely finish the cleaning within the time window, then the charging is not stopped. This results in the rechargeable battery not being completely drained, which has a positive effect on the rechargeable battery service life.

In a further advantageous embodiment, the mobile, self-propelled appliance automatically determines its cleaning time in this time window. This means that the appliance decides itself whether and when it charges its rechargeable battery and when it carries out what cleaning tasks. The chronological sequence of a cleaning task and rechargeable battery charging is left to the appliance. For example, before the start of the cleaning task the appliance estimates whether its current rechargeable battery charge is sufficient for completing the task. On the basis of this estimation, the cleaning can be stopped before a low rechargeable battery level is reached, in order to charge the rechargeable battery. Thus the rechargeable battery can be further protected since low charge levels in the rechargeable battery occur far less often.

In order to determine at what time the appliance has to stop the interim charging of the rechargeable battery and continue the cleaning, the appliance incorporates into the calculation the time required for cleaning the remaining area. An additional consideration of the rechargeable battery charge required for this region is not necessarily required. Information about whether the set time window can be adhered to, which refers both to the time required for cleaning and charging and to the rechargeable battery charge required for the cleaning and thus the recharging, can be output to the user when setting the time window.

In a further advantageous embodiment, when exceeding the time window the mobile, self-propelled appliance continues its cleaning task if this can be completed within a predetermined tolerance time range. The estimation as to how long the appliance requires for a portion of the cleaning still remaining or how much charge in the rechargeable battery is required therefor, can deviate from the actual value due to unforeseen events, such as for example new or moved obstacles which have to be avoided, new or moved rugs which require more power than hard floors, and the like, whereby the time window can be exceeded. The user can decide how the appliance should proceed when the time window is exceeded. The appliance can continue its cleaning and attempt to finish this cleaning within a certain tolerance range which is defined, in particular, by the user. Alternatively, the user can specify that the appliance has to stop the cleaning, irrespective of the region which has not yet been cleaned.

In a further advantageous embodiment, the mobile, self-propelled appliance determines its recharging time such that this recharging time starts after completing the cleaning of a room or area. In particular, it is advantageous for the user if the appliance does not stop its cleaning task in the middle of a room in the case of a drained rechargeable battery and then continues again after the charging has taken place, but if the appliance always completely finishes a room or an area defined by the user and starts with a different area after the rechargeable battery has been charged. To this end, the appliance estimates already at the start, or before the start, of the cleaning of a room or an area whether the remaining rechargeable battery charge is sufficient in order to complete the cleaning of the room. If no area in a list of areas intended for cleaning is small enough or sufficient charge is required in order to finish the cleaning thereof before requiring a return to the charging station, the appliance travels directly to the charging station.

In a further advantageous embodiment, the mobile, self-propelled appliance carries out cleaning of a room or area and/or the cleaning sequence thereof as a function of the charge capacity. In particular, attention should be given here to the fact that more charge has to be present in the rechargeable battery for rooms or areas where the appliance requires more time or charge for the cleaning thereof than for other rooms or areas, whereby it is advantageous if the appliance starts with these rooms or areas. If, after charging up the rechargeable battery, only those areas remain where the appliance requires less time or charge for the cleaning thereof, less charge has to be put into the rechargeable battery during recharging. The charging period can thus be shorter and stopped correspondingly early. If it is intended by the user that the appliance should always clean only complete rooms or areas and should have to complete its cleaning when the end of the time window is reached, the appliance can vary the sequence of cleaning tasks or the rooms/areas to be cleaned, wherein the possibly omitted rooms/areas are given preference in the next time window.

In a further advantageous embodiment, the option is provided to the user via the cleaning app to stop the current interim charging phase of the appliance and thus to continue the cleaning. In this case, the appliance possibly does not have enough charge in the rechargeable battery in order to complete the cleaning fully. A message can inform the user that the preferred continuing of the cleaning and thus the stoppage of the recharging can lead to the appliance not being able to complete the cleaning. The user can actively decide to finish the cleaning completely and carry out further charging, or to bring the cleaning to an end as quickly as possible with a small charge, but possibly incompletely. In the case of incomplete cleaning, the appliance does not continue with the cleaning after the rechargeable battery has been charged but it is specified by the command provided by the user that, should the rechargeable battery charge level be too low, the appliance ends the cleaning task before the desired cleaning is completed, by traveling to the charging station.

In a further advantageous embodiment, the mobile, self-propelled appliance accesses a calendar of the user in order to generate automatically the time window and/or the time period. In this case, the time window and/or the time period is not actively specified by the user but passively via their own calendar. Thus there is the option here to provide the appliance with the authorization to access the calendar. Preferably, the residents or users of a shared apartment can adjust whether a disturbance by the appliance is permitted or whether they do not wish to be disturbed in specific time windows or time periods by a cleaning task of the appliance, or whether possibly only predetermined regions or areas should be omitted during the cleaning, for example when the users are in their apartment in accordance with the calendar.

In a further advantageous embodiment, the charge level of the rechargeable battery is kept between 20% and 80%, preferably between 30% and 50%, in the time period in which the rechargeable battery of the mobile, self-propelled appliance is not to be charged and/or greater than 80% outside the time period. The rechargeable battery of the appliance thus is not charged or at least barely charged in the predetermined time period (the charge capacity should not exceed a maximum value, i.e. a predefined threshold value), since it can be foreseen in the time period that the appliance should not carry out any cleaning tasks, such as for example at night. Outside the time period in which it can be foreseen that the user wishes to use the appliance for their cleaning, the appliance is instead charged as usual according to a required charge capacity, i.e. above the predefined threshold value, and thus is available at all times to the user.

In a further advantageous embodiment, the specified charge capacity (specified minimum value) is 20% or less. In the predetermined time period, in particular, no trickle charging, which fully charges the rechargeable battery again, is carried out in the rechargeable battery. If the charge level in the time period drops below a critical minimum value, however, for example 20% of the rechargeable battery capacity, the rechargeable battery is charged to an ideal storage charge level of, for example, 50% of the rechargeable battery capacity. In the time period, the charge level of the rechargeable battery will drop as a whole by self-discharge and by further active consumers in the appliance. The overall low rechargeable battery capacity over time results in improved conditions for the rechargeable battery, which have a positive effect on the service life thereof.

In a further advantageous embodiment, at the end of the time period the rechargeable battery is charged up to its full charge capacity. At the end of the time period, the rechargeable battery is thus charged up again to its full charge capacity in good time before the user wishes to use the appliance. For the daily routine or cleaning tasks to be started spontaneously, the full rechargeable battery is available to the appliance after the time period.

In a further advantageous embodiment, the rechargeable battery is not charged at a start of the time period, in particular after its cleaning task. It is possible that a cleaning task overlaps with the start of the set time period. Preferably, in this case the cleaning pass is not stopped but continued. Preferably, the rechargeable battery is not charged again after the cleaning pass has finished, unless the charge level falls below the specified minimum charge capacity. In particular, an overlap of a cleaning task and the time period is advantageous since the rechargeable battery in this case has a low rechargeable battery level and thus improved storage conditions for the remaining time period.

In a further advantageous embodiment, the appliance can be started manually by the user for cleaning in the time period. To this end, the appliance estimates whether the rechargeable battery level remaining to the appliance is sufficient for this cleaning task and the appliance thus does not have to be charged up before the start of the cleaning pass. If the rechargeable battery level is not sufficient, the rechargeable battery is charged before the cleaning pass. By the appliance estimating how much charge is required for finishing the task, a partial charging of the rechargeable battery is sufficient. Alternatively, the rechargeable battery can also be fully charged. If a cleaning task taking place in the time period requires more rechargeable battery charge than is available in the rechargeable battery, an interim charging can be carried out in order to be able to complete the cleaning task.

If the end of the cleaning task is within the time period, the rechargeable battery is only charged up to a threshold value after the cleaning pass or when the specified minimum value is fallen below.

Both the reduced number of trickle charge pulses with a high cell voltage and the generally reduced charge level have an advantageous effect on the service life of the rechargeable battery. If a user fixes, for example, a time period from 19:00 hours to 07:00 hours, this means for example 12 hours per day in which the rechargeable battery is not stressed by a forced high charge level. This provides better conditions for the rechargeable battery for approximately half of its running time.

BRIEF DESCRIPTION OF THE FIGURES

The invention is explained in more detail with reference to the following embodiments of the invention which merely represent examples, in which.

DETAILED DESCRIPTION OF THE INVENTION

Figure 1:
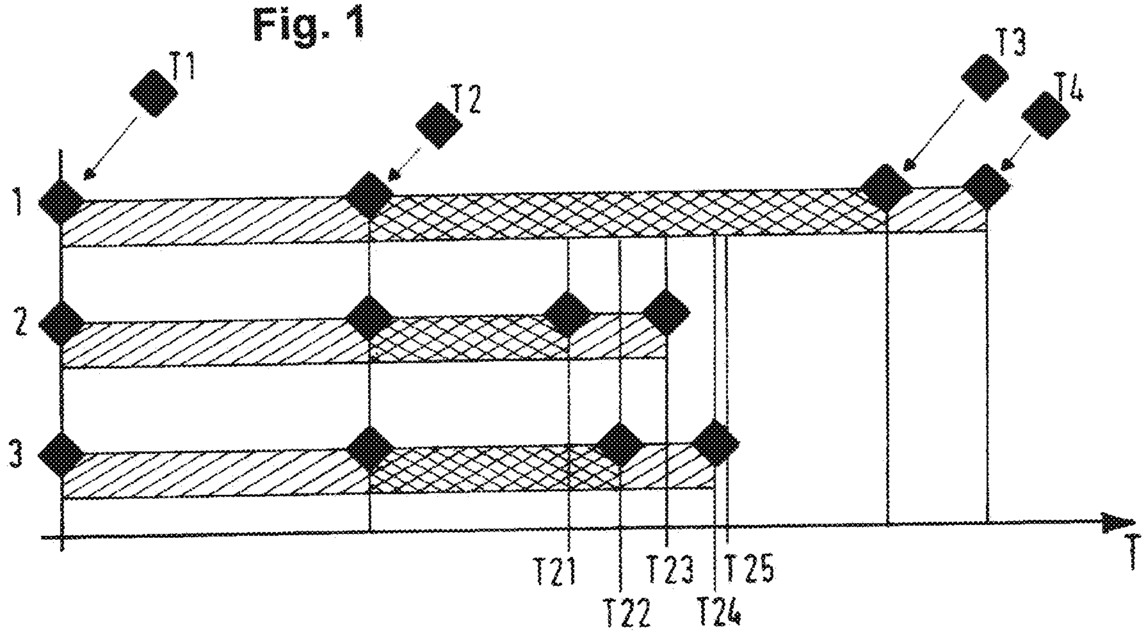
FIG. 1: shows a schematic diagram which represents the total duration of different recharging methods in robot vacuum cleaners.

The inventive idea is shown schematically in FIG. 1 of how the total duration T of processing a cleaning task of a mobile, self-propelled appliance, in particular a robot vacuum cleaner, can be reduced by a charging time of the robot vacuum cleaner at the charging station being limited by a user by setting a time window. The time diagram of FIG. 1 shows a comparison between conventional recharging 1, intelligent recharging 2 and time window-based recharging 3.

With conventional recharging 1, the robot vacuum cleaner starts its cleaning task at the time T1. The cleaning is carried out until recharging is required due to a low charge capacity of a rechargeable battery of the robot vacuum cleaner at the time T2. In the conventional principle, the rechargeable battery is fully charged up from the time T2 to the time T3. After being fully charged up at the time T3, the cleaning is continued until it has been fully carried out or completed at the time T4.

With intelligent recharging 2, the total duration of the cleaning, including recharging the rechargeable battery, is reduced by the robot vacuum cleaner calculating, as required, how much charge is needed in the rechargeable battery in order to complete the intended cleaning task, wherein only as much energy is charged into the rechargeable battery as is actually required. In the present case, the cleaning starts at the time T1 until charging up is necessary at the time T2 due to the low charge capacity. The rechargeable battery, however, is only partially recharged here. At the time T21 the recharging of the rechargeable battery is stopped by the robot vacuum cleaner and the cleaning continued until at the time T23 this cleaning is successfully completed. In comparison with conventional recharging 1 in which the rechargeable battery is filled to 100% during recharging before the robot vacuum cleaner continues the cleaning, with intelligent recharging 2 the charging process is ended by the robot vacuum cleaner as soon as sufficient charge is present in the rechargeable battery. As a result, advantageously the total duration of the cleaning, including the charging of the rechargeable battery, can be significantly reduced.

With time window-based charging 3, the mobile, self-propelled appliance carries out its tasks autonomously. In addition to automatically planning and implementing the cleaning tasks, this includes the independent locating of the charging station and the recharging of the rechargeable battery in order to have sufficient charge capacity available for future cleaning tasks. In order to disturb or hinder the user as little as possible, it is advantageous to limit the charging time at the charging station by the user setting a time limit or a time window. In some circumstances, however, it is not necessary to plan simply for a minimum time duration of the appliance at the charging station. If, for example, the user is not at home at the time the cleaning is carried out, it is not necessarily required that the appliance finishes as quickly as possible. With time window-based charging, the user permits the appliance a maximum total duration or an end time of day by which the appliance has to be finished. The appliance can freely divide the cleaning and charging time in this time window, wherein it is also possible to fall short of the total duration. The appliance thus adapts its recharging time on the basis of the time window.

With time window-based charging 3, the robot vacuum cleaner starts its cleaning task at the time T1. The cleaning is carried out until recharging is necessary due to a low charge capacity of a rechargeable battery of the robot vacuum cleaner at the time T2. Relative to the possible duration of the charging time, the appliance estimates how long it requires for a remaining portion of the cleaning and/or how much charge in the rechargeable battery is actually required therefor, whereby the minimum required charging time can be determined. The estimation is based on cleaning passes of the appliance already carried out. Also taken into consideration in the charging time duration is an end time T25 which is specified by the user, and the total cleaning, including charging time, should be completed at this time. Depending on the specified time window T1 to T25 the appliance ends its charging process at the time T22 so that all of the cleaning is fully completed at the time T24 which is before the end time T25.

If the time window T1 to T24 specified by the user cannot be adhered to from the start, since for example it is too narrow, corresponding feedback and/or a corresponding warning message can be output to the user when the time window is input.

Figure 2:
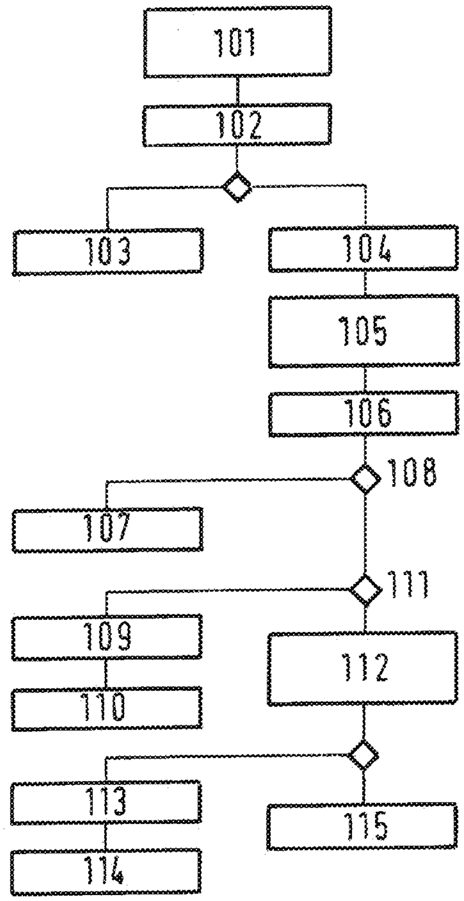
FIGS. 2, 7: show in each case a flow diagram for cleaning by a robot vacuum cleaner with the time window or time period.

A flow diagram for a cleaning method with a time limit is shown in FIG. 2. In the first method step 101, the user programs a cleaning task with a time limit or starts a cleaning program with a time limit. Next, the robot vacuum cleaner starts its cleaning (step 102). If the robot vacuum cleaner fully completes the cleaning before reaching the time limit, it returns to the charging station (step 103). If the robot vacuum cleaner has to stop its cleaning in order to charge up its empty rechargeable battery, it travels to the charging station and begins the charging of the rechargeable battery (step 104). The robot vacuum cleaner estimates how much time is required in order to clean the remaining area(s) and thus determines the time when the charging up has to be stopped (step 105). At the calculated time, the robot vacuum cleaner stops the charging up of the rechargeable battery and continues its cleaning (step 106). If the robot vacuum cleaner fully completes the cleaning before reaching the time limit, it returns to the charging station (step 107). If in step 108 the time limit is reached before the robot can complete the cleaning, and the user does not permit the time limit to be exceeded, the robot vacuum cleaner stops the cleaning when the time limit is reached (step 109) and returns to the charging station (step 110). If the user permits the time limit to be exceeded by a tolerance value (step 111) and if the time limit is reached, the robot vacuum cleaner estimates how much time is required in order to clean the remaining area and checks whether this time duration is shorter than a tolerance value defined by the user (step 112). If the estimated remaining time is greater than the tolerance value, the robot vacuum cleaner stops its cleaning (step 113) and returns to the charging station (step 114). If the estimated remaining time is less than or equal to the tolerance value, however, the robot vacuum cleaner fully completes the cleaning and then returns to the charging station (step 115).

In the cleaning method, therefore, unforeseen events such as, for example, moved obstacles and the like which influence the cleaning time, can be considered by the robot vacuum cleaner. To this end, the user specifies how the robot vacuum cleaner should proceed when the time limit is exceeded. Within a tolerance range defined by the user, the robot vacuum cleaner can continue its cleaning and attempt to finish this cleaning. Alternatively, the user can predetermine that the robot vacuum cleaner has to stop the cleaning, irrespective of the still uncleaned region.

The robot vacuum cleaner can estimate before the start of the cleaning task whether its current rechargeable battery charge is sufficient for completing the task (in step 102). Based thereon, the cleaning can be stopped even before a low rechargeable battery level is reached, in order to charge the rechargeable battery (for example already in step 102). In this case, the rechargeable battery is further protected since low charge levels in the rechargeable battery occur less frequently.

In step 105 the robot vacuum cleaner incorporates into its calculation only the time required for cleaning the remaining areas in order to determine at which time the robot vacuum cleaner has to stop the interim charging of the rechargeable battery and continue the cleaning. In contrast thereto, in step 101 information about the ability to adhere to the set time limit can be output to the user, when setting the time limit, which relates both to the time required for the cleaning and for the charging and to the rechargeable battery charge required for the cleaning and thus for the recharging.

It is advantageous if in step 104 the robot vacuum cleaner does not stop its cleaning in the middle of the room when a rechargeable battery is drained, and then continues there, but always when a room or an area defined by the user is completely finished, and starts in another room or another area after the rechargeable battery has been charged. To this end, before starting to clean a room or an area, the robot vacuum cleaner estimates whether the remaining rechargeable battery charge is sufficient in order to complete the cleaning of the room or the area. If no area in the list of areas provided for cleaning is small enough or sufficient charge is required in order to finish the cleaning thereof before requiring a return to the charging station, the robot vacuum cleaner travels directly to the charging station.

It should be noted here that more charge has to be present in the rechargeable battery for rooms or areas where the robot vacuum cleaner requires more time or charge for the cleaning thereof. It is advantageous if the robot vacuum cleaner starts with these rooms or areas. If, after charging up the rechargeable battery, only those areas remain where the robot vacuum cleaner requires less time and charge for the cleaning thereof, it is sufficient to put only a small charge into the rechargeable battery during the recharging, whereby the charging period can be kept short.

The robot vacuum cleaner can vary the sequence of the rooms or areas with the next cleaning task and give preference to the omitted rooms or areas, if it is specified that only complete rooms or areas are to be cleaned and/or the robot vacuum cleaner has to complete its cleaning after reaching its time limit.

Via their app on the cell phone, the user in step 106 can stop the current interim charging phase of the robot vacuum cleaner in order to continue the cleaning. If the robot vacuum cleaner does not have enough charge in the rechargeable battery in order to complete the cleaning fully, a message can be output to the user that the preferred continuing of the cleaning and thus the stopping of the recharging can lead to the robot vacuum cleaner not being able to complete the cleaning. As a result, an active intervention by the user is possible. The user can decide whether it is important to finish the cleaning completely and to continue charging, or whether the user would rather complete the cleaning as quickly as possible even if this cleaning is then incomplete. If the charging is stopped prematurely, the robot vacuum cleaner ends the cleaning task when the rechargeable battery level is low, before the desired cleaning is completed, by traveling to the charging station or a different starting point.

In step 101, in addition to the active specification of the time limit by the user, it is alternatively possible that the robot vacuum cleaner accesses the calendar of the user. Here the user or the residents of an apartment can set whether they do not wish to be disturbed by a cleaning task of the robot and/or whether specific regions or areas should be avoided when the user or the residents are in the apartment in accordance with the calendar.

Figure 3:
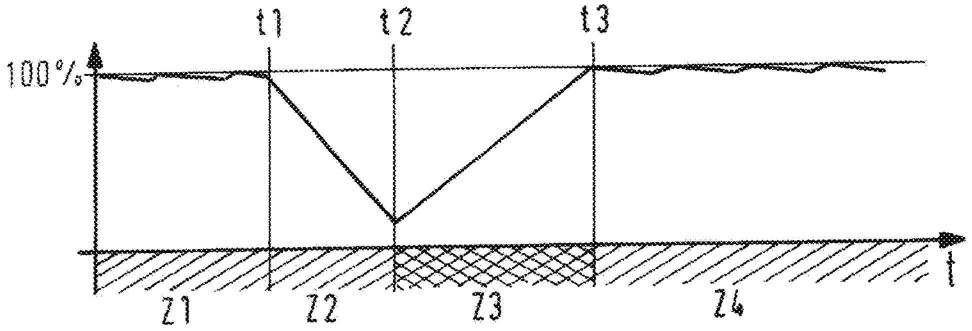
Fig. 3 (Prior art)
FIG. 3: shows a schematic diagram according to the prior art which represents the time versus the charge level of a robot vacuum cleaner.
Figure 4:
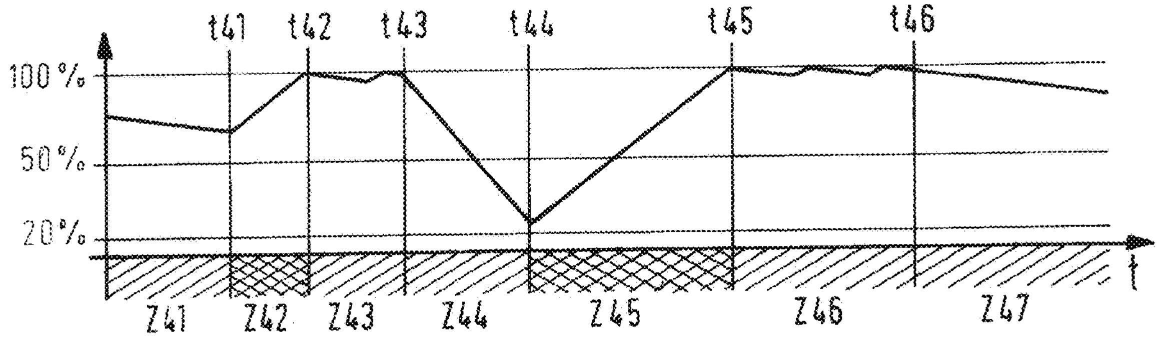
FIGS. 4 to 6: show in each case a schematic diagram which represents the time versus the charge level of a robot vacuum cleaner.
Figure 5:
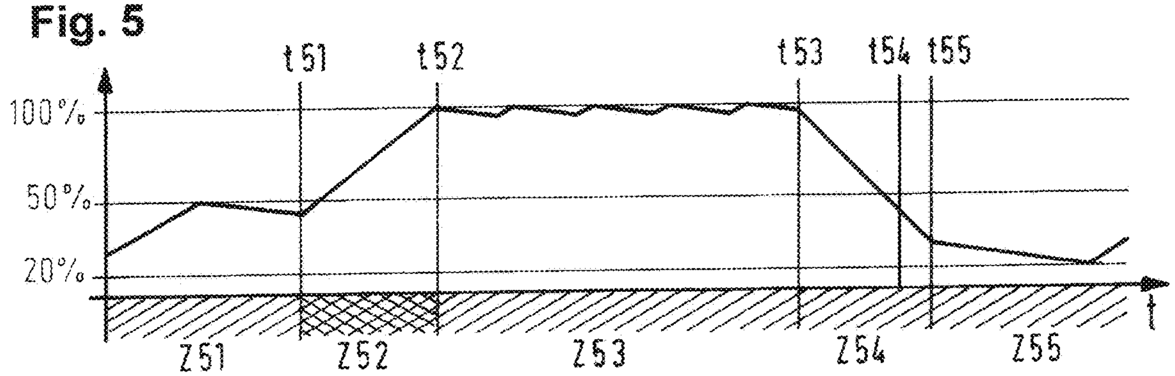
Figure 6:
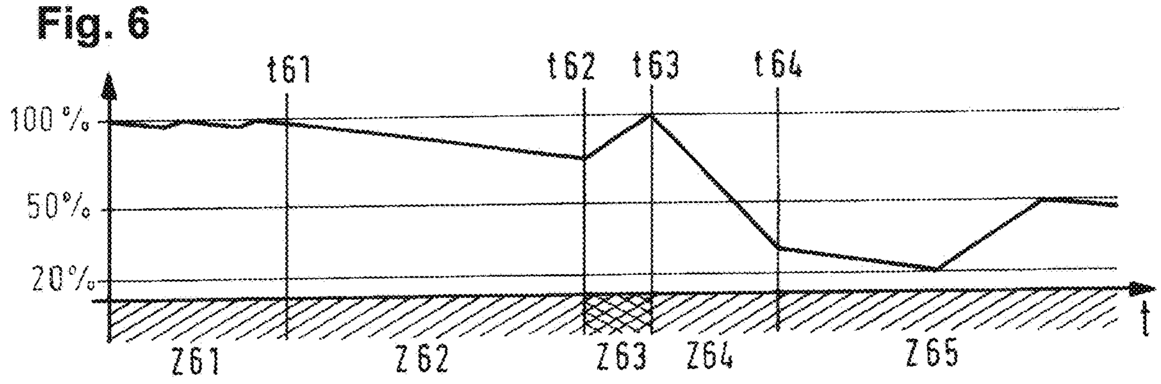

Diagrams are shown in FIGS. 4 to 6 which illustrate time periods defined by the user in which the charging of the robot vacuum cleaner is not permitted, in order to provide better conditions for the rechargeable battery and thus to increase its service life in this manner. To this end, FIG. 3 shows a diagram according to the prior art. In each case, the charge level up to 100% is plotted on the y-axis. The x-axis is a time axis.

The diagram of FIG. 3 shows a standard method in which the robot vacuum cleaner can be started at any time for cleaning and ideally always has an almost full charge level of the rechargeable battery. The rechargeable battery is charged up again after a cleaning task is completed and can be kept at a charge value which is as full as possible in spite of a slow discharge of the rechargeable battery, by repeated trickle charging in the subsequent waiting time before the next cleaning. The permanently high charge level and the relatively frequent charging cycles on the basis of a plurality of trickle charges, however, can stress and more rapidly age the rechargeable battery.

In a first time range Z1, the rechargeable battery is kept as far as possible at a full charge level at the charging station by means of trickle charging. To this end, continuous or very frequent repeated charging of the rechargeable battery takes place in order to ensure that the charge level is kept permanently at approximately 100% of the rechargeable battery capacity. At a time t1 the robot vacuum cleaner receives a cleaning command from the user. In the time period Z2, therefore, a cleaning takes place in which the robot vacuum cleaner carries out the predefined cleaning task. At the time t2, after the robot vacuum cleaner has completed its cleaning task, the robot vacuum cleaner travels to the base station in order to charge its rechargeable battery. In the time period Z3, the rechargeable battery is fully charged until it has a full rechargeable battery capacity at the time t3, which is kept at a full level in the time period Z4 by means of trickle charging.

According to the invention, the user now specifies a time period within which the rechargeable battery of the robot vacuum cleaner is not recharged in order to delay the ageing thereof and to increase the service life. This is shown graphically in FIGS. 4 to 6.

The user specifies resting phases (time periods) for the rechargeable battery in which the rechargeable battery is not charged but is slowly discharged by intrinsic discharge or other active systems in the robot vacuum cleaner. The user can fix the start and end times of the time periods in order to adapt the cleaning method to their everyday routine. A plurality of time periods are possible with resting phases for each day or different time periods depending on the day of the week. No trickle charging, which fully charges the rechargeable battery again, is carried out in the rechargeable battery in these time periods. If, however, the charge level drops during a resting phase below a critical value, such as for example 20% of the rechargeable battery capacity, the rechargeable battery is charged to an ideal storage charge level of, for example, 50% of the rechargeable battery capacity. At the end of the resting phase (time period) and thus in good time before the user reuses the robot vacuum cleaner, the rechargeable battery is charged up to a full charge level. For daily routines or cleaning tasks of the user started spontaneously, the full rechargeable battery is available again to the robot vacuum cleaner.

In a first time period Z41, the robot vacuum cleaner, for example, is in the resting phase and accordingly not charged. The rechargeable battery capacity drops. At the time t41, the robot vacuum cleaner starts the charging at the charging station (time period Z42) in order to reach the full rechargeable battery capacity at the end of the resting phase (time t42). From the time t42, the rechargeable battery is kept at a full charge level by trickle charging (time period Z43) since this time period is outside the resting phase and the robot vacuum cleaner should be available for possible (spontaneous) cleaning tasks. At the time t43, the vacuum cleaner receives a cleaning command and performs its cleaning task in the time period Z44. At the time t44, the cleaning task is completed and the charging of the rechargeable battery starts (time period Z45) at the charging station until it is fully charged at a time t45. Since the following time period Z46 is not in the specified resting phase, trickle charging takes place in order to keep the rechargeable battery capacity at a high level. The resting phase (time period Z47) begins at a time t46, in which no rechargeable battery charging and no trickle charging takes place. The rechargeable battery level of the rechargeable battery slowly drops.

In FIG. 5 it is shown graphically how to proceed when a cleaning task overlaps with the start of the set resting phase. The cleaning pass in this case is not stopped but continued. After completing the cleaning task, the rechargeable battery is not charged unless the charge level falls below the critical value (specified minimum value) of, for example, 20% of the rechargeable battery capacity.

In a first time period Z51, the robot vacuum cleaner is in a resting phase. A rechargeable battery charging takes place here only when falling below a critical value of the rechargeable battery capacity. The resting phase specified by the user terminates at a time t52, so that the robot vacuum cleaner starts the charging of the rechargeable battery in good time beforehand at the time t51 (time period Z52). From the time t52, the charge level of the rechargeable battery is kept at a high, substantially full level (time period Z53). In particular, trickle charging takes place. At the time t53, the robot vacuum cleaner receives a cleaning command and starts its cleaning (time period Z54). During the cleaning phase, at a time t54, the resting phase specified by the user starts. Nevertheless, the robot vacuum cleaner completes its cleaning task. After completing the cleaning task (time t55) the robot vacuum cleaner remains in its resting phase (time period Z55). This means that the rechargeable battery is not charged, apart from when the charge level reaches a specified minimum value. Then charging takes place up to a defined storage value. At the end of this resting phase, the rechargeable battery is fully charged up again.

In FIG. 6 it is shown graphically how to proceed when the robot vacuum cleaner is started for cleaning during the resting phase. Previously the robot vacuum cleaner has estimated whether the rechargeable battery charge level remaining to the robot vacuum cleaner is sufficient for this cleaning task and whether a charging up of the rechargeable battery is not required before the start of the cleaning pass. If such an estimation is not carried out, or it is established that the remaining charge level is not sufficient, the rechargeable battery is charged, preferably fully, before the start of the cleaning pass, or if an estimation is present, only partially charged—as a function of how much charge is necessary for finishing the task. If a cleaning task taking place in the resting phase requires more rechargeable battery charge than is available in the rechargeable battery, an interim charging takes place in order to be able to complete the cleaning task. If the end of the cleaning task is within the resting phase, the rechargeable battery is not charged up after the cleaning pass.

A first time period Z61, in which trickle charging takes place, transitions to a time t61 in the resting phase (time period Z62). In this resting phase, the robot vacuum cleaner receives a cleaning command at the time t62. The robot estimates that the charge present in the rechargeable battery is not sufficient for the cleaning task and thus begins with the full charging of the rechargeable battery (time period Z63). In the following time period Z64 the robot vacuum cleaner carries out the cleaning until this is completed (t64). Since the end time t64 is still within the specified resting phase, at the completion of the cleaning the rechargeable battery is charged in the remaining resting phase with charges up to a defined storage value only if the rechargeable battery level falls below the critical minimum value.

Figure 7:
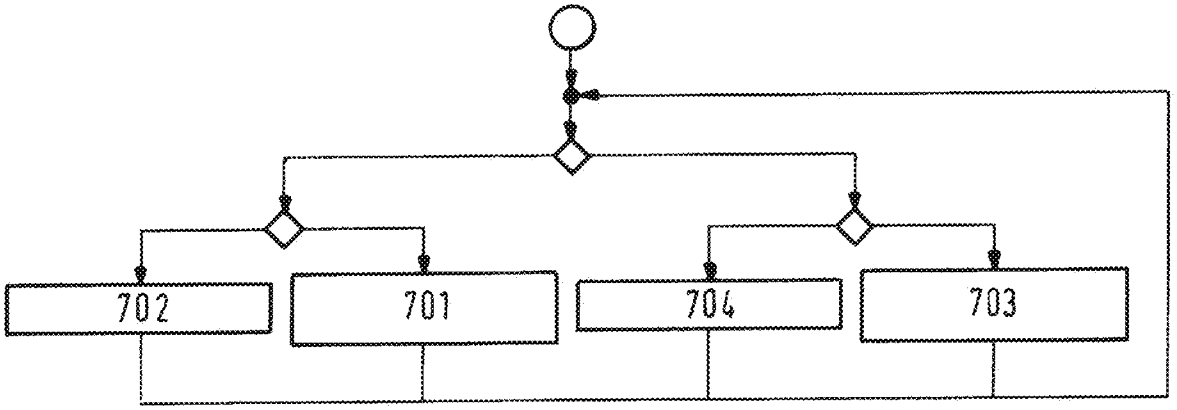

In FIG. 7 a flow diagram is shown for a cleaning method having resting phases. If the robot vacuum cleaner is outside the resting phase and the user starts a cleaning task, the robot vacuum cleaner carries out the cleaning task, wherein the rechargeable battery is fully charged again after the cleaning task (step 701) is completed. If the robot vacuum cleaner is outside the resting phase and the charge level drops below a defined threshold value, the rechargeable battery is fully charged up and kept at this full level-trickle charging takes place to the full level (step 702). If the robot vacuum cleaner is in the resting phase and the user starts a cleaning task, the rechargeable battery is fully charged up at the start of the cleaning activity so that the cleaning task can then be carried out (step 703). If the robot vacuum cleaner is within the resting phase and the charge level drops below a critical minimum value, trickle charging takes place up to a storage value (partial value). The charge level is kept between the critical minimum value and this partial level-trickle charging takes place on the basis of the charge value (step 704).

The invention claimed is:

1. A method for operating a mobile, self-propelled appliance having a rechargeable battery, the method comprising:

specifying by a user on a portable auxiliary device at least one of the following:

a time window in which the mobile, self-propelled appliance should carry out at least one specified cleaning task, and automatically determining, by the mobile, self-propelled appliance, a recharging time of the rechargeable battery in the time window, or a time period in which the mobile, self-propelled appliance does not have to carry out a cleaning task, and automatically determining, by the mobile, self-propelled appliance at an end of the time period to charge the rechargeable battery to a full charge capacity thereof; and the time window being as an end time of day by which the mobile, self-propelled appliance has to be finished cleaning, or as a maximum total time duration which contains a start time and an end time and a time phase therebetween;

the time period being as a time duration which contains a start time and an end time and a time phase therebetween; and the mobile, self-propelled appliance freely divides the cleaning and charging time in the time window.

2. The method according to claim 1, wherein the mobile, self-propelled appliance is a floor cleaning appliance being at least one of a vacuum robot, a sweeping robot, or a wiping robot.

3. The method according to claim 1, which comprises not charging the rechargeable battery within the time period, except at an end of the time period, unless a charge level of the rechargeable battery falls below a specified charge capacity.

4. The method according to claim 1, which comprises, when the charge capacity of the rechargeable battery is low, charging up the rechargeable battery within the time window, while ensuring that the time window specified by the user is not exceeded.

5. The method according to claim 4, which comprises terminating the charging by the mobile, self-propelled appliance in order to complete the cleaning task within the time window.

6. The method according to claim 5, which comprises calculating a remaining time in the time window by analyzing previous cleaning passes, taking into account at least one of a required time or a required energy consumption with a corresponding power level.

7. The method according to claim 1, which comprises putting out a warning message to the user via the portable auxiliary device if the cleaning task, with a required charging process, requires longer than the specified time window.

8. The method according to claim 1, wherein the time window is a maximum time duration which may be undershot.

9. The method according to claim 1, wherein the mobile, self-propelled appliance automatically determines a cleaning time in the time window.

10. The method according to claim 1, which comprises, when the time window is exceeded, continuing the cleaning task with the mobile, self-propelled appliance is the cleaning task can be completed within a predetermined tolerance time range.

11. The method according to claim 1, which comprises determining the recharging time by the mobile, self-propelled appliance so that a recharging takes place after completing a cleaning of a room or an area.

12. The method according to claim 1, which comprises cleaning a room or area, and/or a corresponding cleaning sequence, by the mobile, self-propelled appliance as a function of the full charge capacity.

13. The method according to claim 1, which comprises accessing with the mobile, self-propelled appliance a calendar of the user in order to automatically generate at least one of the time window or the time period.

14. The method according to claim 1, which comprises not charging the rechargeable battery within the time period, except at an end of the time period, unless a charge level of the rechargeable battery falls below a specified charge capacity, and maintaining the charge level of the rechargeable battery between 20% and 80% in the time period or maintaining the charge level greater than 80% outside the time period.

15. The method according to claim 14, wherein the specified charge capacity is 20% or less.

16. The method according to claim 14, wherein the rechargeable battery is not charged at a start of the time period.

17. The method according to claim 14, which comprises not charging the rechargeable battery immediately after a cleaning task.

* * * * *